UNITED STATES PATENT OFFICE.

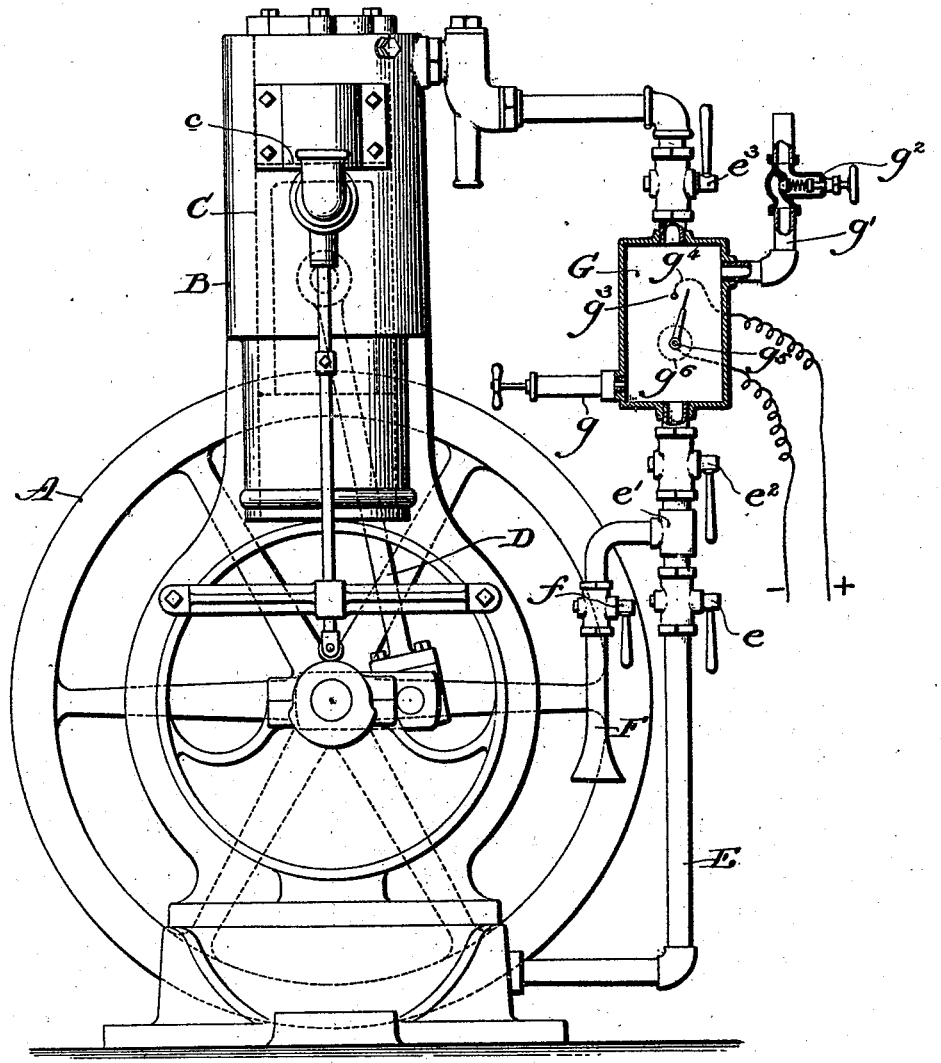

RUSSELL THAYER, OF PHILADELPHIA, PENNSYLVANIA.

GAS-ENGINE.

SPECIFICATION forming part of Letters Patent No. 517,077, dated March 27, 1894.

Application filed October 11, 1893. Serial No. 487,826. (No model.)

*To all whom it may concern:*

Be it known that I, RUSSELL THAYER, a citizen of the United States, residing at Philadelphia, county of Philadelphia, and State of Pennsylvania, have invented a new and useful Improvement in Gas-Engines, of which the following is a full, clear, and exact description, reference being had to the accompanying drawing, which forms a part of this specification.

My invention relates specifically to certain improvements for the purpose of testing the admixture of gas and air previous to its entry into the cylinder, and determining previous to its entry into the cylinder that the admixture is in proper proportion to produce an explosion. In the gas engines now in use the only means for testing the character of this admixture is in the operating cylinder itself, the operator adjusting the proportionate quantities of gas and air according to his best judgment, and then admitting said admixture into the operating cylinder, he then by hand turns the fly wheel which moves the piston forward, allowing the entry of this admixture back of the piston. In the return movement of the piston an electric circuit is formed producing a spark in the cylinder and igniting the admixture of gas and air, which, if it be in the correct proportion, explodes, driving the piston forward, and the machine operates automatically. But if the admixture should not be such as to produce an explosion, then the operator is forced to change the quantity of admission of either air or gas, as the case may be, again admit it to the cylinder, again by hand turn over the fly wheel, and, as these machines are not of necessity operated by skilled mechanics, it is often only at the expense of considerable labor that the correct admixture is obtained. Again, if the proportions of admission of air and gas be adjusted at a given time to produce the proper admixture, at another period in use the gas may be leaner or richer, necessitating a readjustment, the correctness of which can only be determined by the exercise of considerable labor, each test requiring the manual turning of the fly wheel. This change of richness of gas is especially the case where the gas is obtained from gas machines.

My improvement consists generally in the interposition of a testing chamber connected with the pipe carrying the admixture of air and gas to the operative cylinder, and interposed at a point between the cylinder and the juncture of the air and gas delivery pipes, and admitting the admixture of air and gas to be tested to said chamber and igniting the same in said chamber. By this means I can make adjustments of quantities of air and gas, admit the admixture to the testing chamber, and ignite the same until the correct admixture is obtained. This can be done without labor or trouble, and the admixture can be tested much more rapidly.

I will now describe a gas engine with my improvement attached thereto in the manner most preferred by me, although I do not intend to limit myself to the particular details therein shown.

The drawing illustrates a gas engine and attachments containing my improvement, in side elevation partially in section.

A represents the fly wheel; B the operating cylinder; C the piston having the piston head $c$; D the connecting rod; E the pipe leading from the source of gas supply, having the cock, $e$; F the air inlet pipe having the cock, $f$. The pipe, F, opens into the pipe E at point $e'$. The pipe E then continues and opens into what I call the testing chamber, which is a chamber G, preferably cylindrical in form, and made of sufficient strength. This cylinder has connected with it the exhaust pump, $g$, and an escape pipe $g'$, having the spring seated valve $g^2$.

$g^3$ is a shaft upon which is fixedly secured the contact, $g^4$ in electrical connection with one pole of an electric current supply, and $g^5$ is a contact, movable by the wheel $g^6$, and connected with the other pole of the same electric current supply. Upon the pipe E, just below its opening into chamber G, is the cock, $e^2$. The pipe E continues from the top of chamber G to the operating cylinder, and is provided with cock $e^3$ at a point between the chamber G and operating cylinder B.

The operation is as follows: The cocks $e^2$ and $e^3$ being closed, the operator by turning the cocks $e$ and $f$ admits air and gas in quantities which he believes to be proper. Any gas or air in chamber G is exhausted by the pump, $g$; the cock $e$ is then opened until the chamber G is filled with the admixture; it is then closed, and the valve $g'$ opened, and the contacts $g^4$ and $g^5$ brought in connection, so that a spark passes which explodes the admixture, if the admixture is in proper proportion of air and gas. The valve $g'$ is spring seated, so that in case it is not opened it will give and open automatically when the explosion occurs. If there is an explosion, valves $e$ and $e^3$ are opened, and the admixture passes to the operating cylinder B. If however an ignition without explosion takes place, then the operation is repeated, the valve or cock $f$ being manipulated to admit more air. This system of testing is carried on until the proper admixture is obtained. By this improved method and apparatus the admixture can be tested until the proper admixture is obtained, and no admixture admitted to the cylinder until the proper one is obtained. This testing is readily carried on and requires no labor and the exercise of but little skill.

By gas engine I intend to include both what is ordinarily termed gas and also explosive vapors.

Having now fully described my invention, what I claim, and desire to protect by Letters Patent, is—

1. In combination with an operating cylinder, a piston in said cylinder, a source of air and gas supply, conduits from said gas and air supply, said conduits opening into each other outside of the operating cylinder, a conduit leading from said juncture to the operating cylinder, and means to fire the contained gaseous mixture in the operating cylinder, of a chamber in said last mentioned conduit, said chamber being adapted to receive and contain the admixture of air and gas, and means to fire the admixture in said chamber.

2. In combination with an operating cylinder, a piston in said cylinder, a source of air and gas supply, conduits from said gas and air supply, said conduits opening into each other outside of the operating cylinder, a conduit leading from said juncture to the operating cylinder, and means to fire the contained gaseous mixture in the operating cylinder, of a chamber in said last mentioned conduit, said chamber being adapted to receive and contain the admixture of air and gas, means to fire the admixture in said chamber, and a valve upon said last mentioned conduit above and below said test chamber.

3. In combination with an operating cylinder, a piston in said cylinder, a source of air and gas supply, conduits from said gas and air supply, said conduits opening into each other outside of the operating cylinder, a conduit leading from said juncture to the operating cylinder, and means to fire the contained gaseous mixture in the operating cylinder, of a chamber in said last mentioned conduit, said chamber being adapted to receive and contain the admixture of air and gas, means to fire the admixture in said chamber, a valve upon said last mentioned conduit above and below said test chamber and a relief valve from said test chamber.

In testimony of which invention I have hereunto set my hand.

RUSSELL THAYER.

Witnesses:
FRANK S. BUSSER,
FRANCES ELLIS.